United States Patent [19]

Pariot

[11] Patent Number: 5,686,710
[45] Date of Patent: Nov. 11, 1997

[54] CONDUCTIVE CORD CONNECTION SYSTEM FOR SENSING STRIPS USED ON MOVABLE POWER DOORS

[75] Inventor: Robert Pariot, New Windsor, N.Y.

[73] Assignee: Techstrip Inc., Pennsauken, N.J.

[21] Appl. No.: 587,962

[22] Filed: Jan. 17, 1996

[51] Int. Cl.⁶ .................................................. H01H 3/16
[52] U.S. Cl. .................................................. 200/61.43
[58] Field of Search ....................... 200/61.43, 61.44, 200/86 R, 85 R; 49/26-28

[56] References Cited

U.S. PATENT DOCUMENTS

| | | | |
|---|---|---|---|
| 5,087,799 | 2/1992 | Pariot et al. | 200/61.43 |
| 5,148,911 | 9/1992 | Miller et al. | 200/61.43 |
| 5,260,529 | 11/1993 | Miller | 200/61.43 |
| 5,438,798 | 8/1995 | Plamper et al. | 49/28 |
| 5,589,811 | 12/1996 | Pariot et al. | 338/210 |

*Primary Examiner*—Adolf Berhane

[57] ABSTRACT

A conductive cord connection system for a movable sliding door with an electrical sensing edge provides a simple and inexpensive cord arrangement. The conductive cord extends, with the door closed, directly from the sensing edge through a door bracket and a wall bracket to a motor operator. With the wall bracket, which frictionally holds the cord, positioned adjacent to the door and spaced from the door bracket, a distance that is one half of the distance of total door travel, the traveling cord portion is substantially straight in the full open and closed positions of the door. When the door is opening or closing, a loop formed in the traveling cord portion does not exceed in length 25 percent of the full door travel.

14 Claims, 2 Drawing Sheets

CONDUCTIVE CORD CONNECTION SYSTEM FOR SENSING STRIPS USED ON MOVABLE POWER DOORS

BACKGROUND OF THE INVENTION

Electrical sensing strips are used on the edges of power doors to provide safe power door operation. Such strips are also used on other sliding closures. A person or object in the closure path causes the strip to deform and an electrical contact to close, resulting in an immediate deenergization or reversal of a drive motor.

Previous door closure systems utilized take-up reels, coiled cords or the like to connect electrically a sensing strip edge to a motor operator. U.S. Pat. No. 5,087,799, by the applicant of this invention, discloses an electrical sensing strip which must be connected to a motor operator.

With the use of coiled cords or take-up reels, gem boxes, strain reliefs, additional wire and intermediate wire connections are needed and add complications and problems to power door operating systems.

BRIEF SUMMARY OF THE INVENTION

The present invention provides an improved conductive cord connection system using a simple arrangement for connecting an electrical sensing edge on a movable power door to a motor operator. In addition, the connection system is inexpensive and easily installed.

More specifically, the inventive conductive cord connection system includes an electrical cord that extends, with the door closed, directly from the sensing edge through a door bracket and a wall bracket to the motor operator. With the wall bracket positioned at a point one half of the distance of the door travel between open and closed positions, the traveling portion of the cord is substantially straight in the open and closed door positions. When the door is opening or closing, a loop formed in the cord does not exceed in length 25 percent of the full travel distance of the door.

An additional advantage of the inventive system involves the use of a door bracket formed of light gauge and readily deformable material which will bend if an obstruction is encountered or if a portion of the cord is trapped. In this fashion injury to a person or the cord is prevented.

The simple and easily installed conductive cord connector system, using two readily fabricated brackets, provides a reliable electrical connection between the sensing edge and the motor operator and will function indefinitely without the need for service.

These and other features and advantages of the invention will be more readily understood when the following description is read in connection with the accompanying drawings.

DESCRIPTION OF EXEMPLARY EMBODIMENTS

Figure 1:
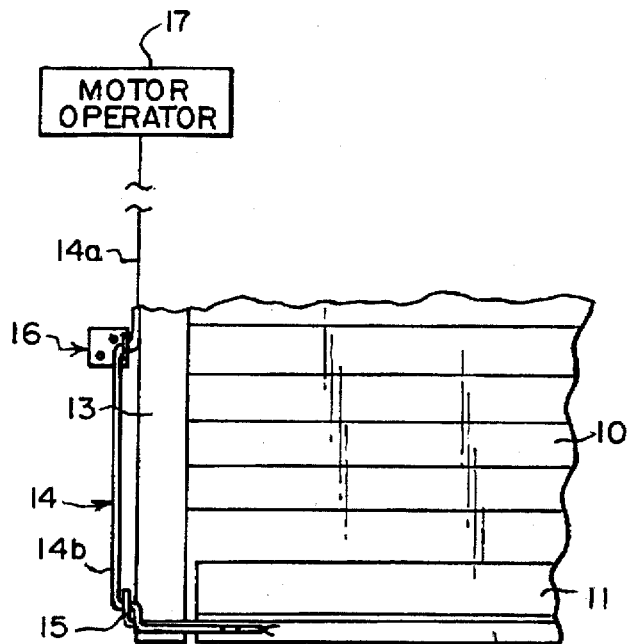
FIG. 1 is a partial view in elevation of one side of a rolling power door carrying an electrical sensing edge using the inventive conductive cord connection system for electrically connecting a sensing edge to a motor operator.

Referring to the drawings in greater detail, with particular reference to FIG. 1, a movable power door 10, here a conventional power operated rolling door, includes a bottom bar 11 carrying a safety sensing strip or edge 12. The door is supported by and slides in tracks 13 on both sides (only one shown). Normally the tracks guide the door to large cylinder (not shown) on which it is rolled and stored. An electrical cord 14 extends from the sensing edge 12 through a door bracket 15 and a wall bracket 16 to a motor operator 17.

The door bracket 15 has a configuration (here shown L-shaped) to guide and hold the cord 14 as it exits from the sensing edge 12. Preferably the bracket 15 is formed from a material having characteristics of ready resilience and bendability, for example, 16 gauge metal. If the bracket encounters an obstruction, for example a person, or if the cord 14 becomes trapped in some fashion, the bracket will be deformed or bent without causing injury to the person or cord.

The wall bracket 16 is positioned at a point spaced from the door bracket 15 with the door closed, such spacing being one half of the distance the door bracket 15 travels during door operation between closed and open positions. The bracket 16 holds the cord 14 to form stationary and traveling cord portions 14a and 14b, respectively. The bracket is mounted on a wall next to the door track 13 and adjacent to the door 10. More particularly, and referring to FIG. 3, the bracket includes a wall attachment plate 16a from which extends an arm 16b formed with an opening carrying a bushing 16c.

The bushing 16c can consist of a plain rubber grommet or, more conveniently, an adjustable plastic bushing that will accommodate smaller or larger cords. The bushing permits the cord 14 to be pulled through the bracket arm 16b but holds the cord in position without crimping or pressure that would create an electrical problem by abrading the cord insulation.

Figure 2:
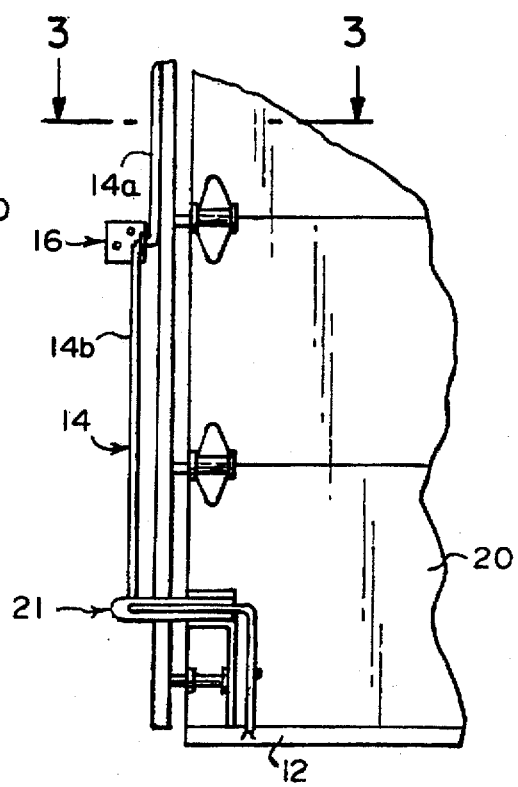
FIG. 2 is a partial view of one side of a sectional power door carrying a sensing edge which is connected by the inventive conductive cord connecting system to a motor operator.
Figure 3:
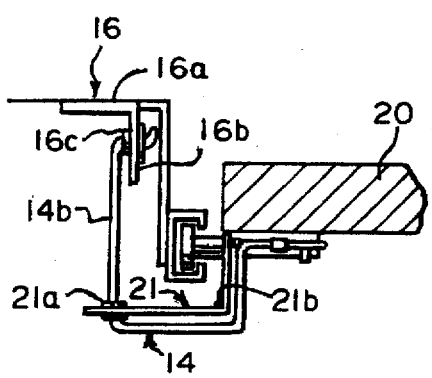
FIG. 3 is a cross-sectional view taken along the line 3—3 of FIG. 2 looking in the direction of the arrows showing a typical arrangement of a door bracket and a wall bracket used in the inventive conductive cord connection system.
Figure 4:
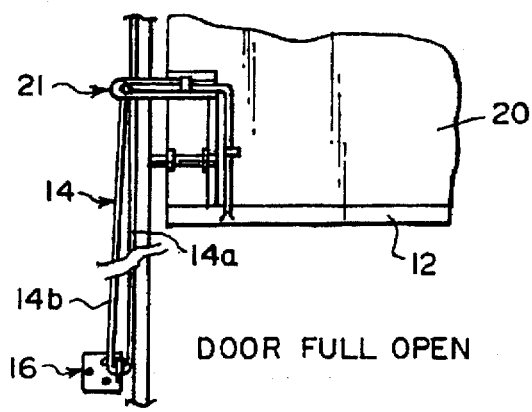
FIG. 4 is a diagrammatic view useful for illustrating the orientation of the conductive cord in the full open position of the sectional door of FIG. 2.

Referring to FIGS. 2 and 3, in which parts similar to those of FIG. 1 are identified by like reference numbers, a sectional door 20 of conventional structure is movable along tracks 13a (only one shown). The wire cord 14 exits from the sensing edge 12 on the door bottom and is threaded through a door bracket 21, L-shaped in elevation and Z-shaped in plan view, as shown in FIGS. 2 and 3, respectively. The cord 14 is threaded along the bracket 21 through a grommeted opening 21a (FIG. 3) and then through the wall bracket 16.

Note that the door bracket 21 is preferably gusseted at 21b (FIG. 3) and elsewhere, if desired, to permit the use of light gauge metal for resilience and bendability, as discussed above in connection with the bracket 14, and yet is sufficiently strong to support and carry the cord 14 under normal conditions.

FIGS. 4–7 depict, in diagrammatic form, the position of the stationary and traveling electrical cord portions 14a and 14b, respectively, with the door fully open, three quarters open, one quarter open and fully closed, respectively. The stationary cord portion 14a does not move as the door operates. However, with the door open in FIG. 4, the traveling cord portion 14b is straight (but not taut) between the wall bracket 16 and the door bracket 21.

Figure 5:
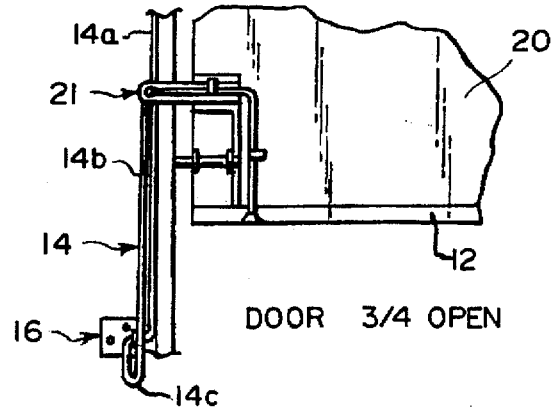
FIG. 5 is another diagrammatic view showing the conductive cord of the sectional door of FIG. 2 with the door in its three-quarter open position.
Figure 6:
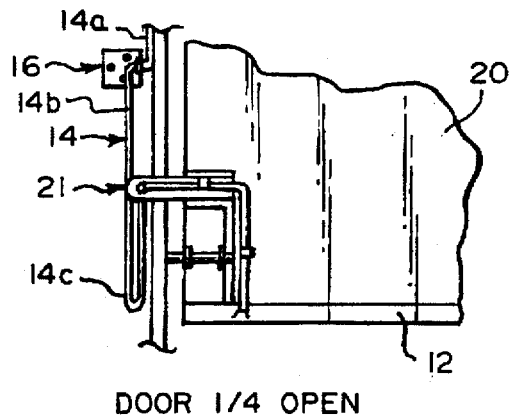
FIG. 6 is a diagrammatic view showing the conductive cord of the sectional power door of FIG. 2 with the door in its one-quarter open position.
Figure 7:
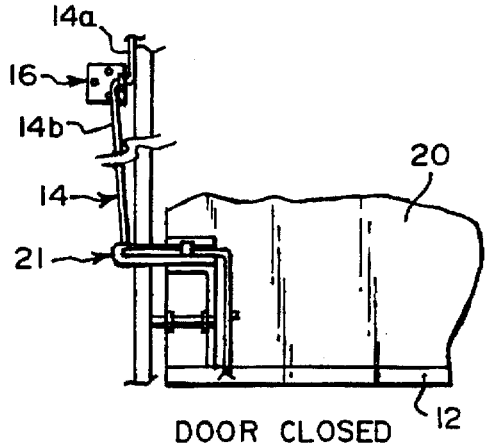
FIG. 7 is a diagrammatic view showing the conductive cord of the door of FIG. 2 with the door in its fully closed position.

As the door is lowered to its three quarter open position, FIG. 5, and then to its one quarter open position, FIG. 6, a loop 14c is formed in the traveling cord portion 14b, increasing in length to the one half open position (with the two brackets 15 and 16 juxtaposed) and then decreasing in length until it disappears in the fully closed position of FIG. 7.

It is evident that the inventive cord connection system eliminates the needs for coiled cords and take-up reels. In addition, it eliminates the need for gem boxes, strain reliefs, and additional wire and intermediate wire connections. Moreover, the cord is never under tension and will roll past most obstructions, and when opening or closing, the loop formed never exceeds 25 percent of full door travel, when the door is one half open. In the full open and closed door positions, the travelling cord portion is out of the way, behind the door track or guide and practically straight. Finally, the inventive cord system is readily installable, neat in appearance, long-lasting and far less costly than coiled type cords or take-up reels.

While the invention has been described with reference to specific embodiments, it will be understood that various changes and modifications may be made within the scope of the invention which is defined by the appended claims.

I claim:

1. Apparatus for conveniently connecting an electrical sensing edge on a movable power door to a motor operator comprising an electrical cord connected to the sensing edge and the motor operator, the length of the cord being sufficient with the door closed to extend between the edge and the motor operator, means for securing the cord at a point adjacent to the door, the point being positioned one half the distance that a second point adjacent to the edge travels between open and closed door positions, thus providing a stationary cord portion and a traveling cord portion, whereby in the full open and full closed door positions, the traveling cord portion is substantially straight, and when the door is opening and closing a loop is formed in the traveling cord portion that does not exceed in length 25 percent of the travel distance of the door, and the loop will roll past most obstructions, and the cord is never under tension.

2. Apparatus as defined in claim 1, wherein the movable door comprises a vertically operated rolling door.

3. Apparatus as defined in claim 1, wherein the movable door comprises a vertically operated sectional door.

4. Apparatus for conveniently connecting an electrical sensing edge on a movable sliding door to a motor operator comprising an electrical cord connected to the sensing edge and the motor operator, the length of the cord being sufficient with the door closed to extend between the edge and the motor operator, a door bracket attached to the door adjacent to the sensing edge, a wall bracket positioned adjacent to one side of the moveable door, the wall bracket also being positioned at a point one half the distance that the door bracket travels between the open and closed door positions, the electrical cord extending from the sensing edge through the door bracket and through the wall bracket to the motor operator, means frictionally holding the cord in the wall bracket to provide a stationary cord portion and a traveling cord portion, whereby in the full open and full closed door positions, the traveling cord portion is substantially straight, and when the door is opening and closing, a loop is formed in the traveling cord portion that does not exceed in length 25 percent of the full travel distance of the door, and the loop will roll past most obstructions, and the cord is never under tension.

5. Apparatus as defined in claim 4, wherein the door bracket is comprised of a material sufficiently flexible to be deformed when it strikes an obstruction or when the cord becomes trapped.

6. Apparatus as defined in claim 4, wherein the movable door comprises a vertically operated rolling door.

7. Apparatus as defined in claim 4, wherein the movable door comprises a vertically operated sectional door.

8. A method of conveniently connecting an electrical sensing edge on a movable power door to a motor operator comprising the steps of connecting an electrical cord to the sensing edge and the motor operator with the length of the cord being sufficient with the door closed to extend between the edge and the motor operator, securing the cord at a first point adjacent to the door, the first point being positioned one half the distance that a second point adjacent to the edge travels between the open and closed door positions, thus providing a stationary cord portion and a traveling cord portion, whereby in the full open and full closed door positions, the traveling cord portion is substantially straight, and when the door is opening and closing, a loop is formed in the traveling cord portion that does not exceed in length 25 percent of the travel distance of the door, and the loop will roll past most obstructions, and the cord is never under tension.

9. A method as defined in claim 8, wherein the movable door comprises a vertically operated rolling door.

10. A method as defined in claim 8, wherein the movable door comprises a vertically operated sectional door.

11. A method of conveniently connecting an electrical sensing edge on a movable power door to a motor operator comprising the steps Of connecting an electrical cord to the sensing edge and the motor operator with the length of the cord being sufficient with the door closed to extend between the edge and the motor operator, attaching a door bracket to the door adjacent to the sensing edge, positioning a wall bracket adjacent to one side of the movable door, the wall bracket also being positioned at a point one half the distance that the door bracket travels between the open and closed door positions, threading the electrical cord from the sensing edge through the door bracket and through the wall bracket to the motor operator, frictionally holding the cord in the wall bracket to provide a stationary cord portion and traveling cord portion, whereby in the full open and full closed door positions, the traveling cord portion is substantially straight, and when the door is opening and closing, a loop is formed in the traveling cord portion that does not exceed in length 25 percent of the full travel distance of the door, and the loop will roll past most obstructions, and the cord is never under tension.

12. A method as defined in claim 11, wherein the door bracket is comprised of a material sufficiently flexible to the deformed when it strikes an obstruction, or when the cord becomes trapped.

13. A method as defined in claim 11, wherein the movable door comprises a vertically operated rolling door.

14. A method as defined in claim 11, wherein the movable door comprises a vertically operated sectional door.

* * * * *